(12) United States Patent
Park et al.

(10) Patent No.: US 6,975,608 B1
(45) Date of Patent: Dec. 13, 2005

(54) METHOD FOR PERFORMING HANDOFF BETWEEN ASYNCHRONOUS BASE STATION AND SYNCHRONOUS BASE STATION

(75) Inventors: Jae-Hong Park, Ichon-shi (KR); Chong-Won Lee, Ichon-shi (KR); Yu-Ro Lee, Ichon-shi (KR); Ho-Geun Lee, Ichon-shi (KR)

(73) Assignee: UTStarcom, Inc., Alameda, CA (US)

( * ) Notice: Subject to any disclaimer, the term of this patent is extended or adjusted under 35 U.S.C. 154(b) by 791 days.

(21) Appl. No.: 09/694,805

(22) Filed: Oct. 23, 2000

(30) Foreign Application Priority Data

| Oct. 22, 1999 | (KR) | 1999-46031 |
| Nov. 1, 1999 | (KR) | 1999-47967 |
| Dec. 11, 1999 | (KR) | 1999-56923 |

(51) Int. Cl.$^7$ ............................................. H04Q 7/00
(52) U.S. Cl. ................................... 370/332; 455/436
(58) Field of Search ....................... 370/310, 328–337, 370/342–343, 503, 509–514, 517–518; 455/436–444

(56) References Cited

U.S. PATENT DOCUMENTS

| 5,533,014 A | 7/1996 | Willars et al. ............... 370/18 |
| 5,666,653 A | 9/1997 | Ahl ............................. 455/330 |
| 5,828,659 A | 10/1998 | Teder et al. ................. 370/328 |
| 5,870,427 A * | 2/1999 | Tiedemann et al. ......... 375/216 |
| 5,896,368 A | 4/1999 | Dahlman et al. ............ 370/335 |
| 6,069,883 A | 5/2000 | Ejzak et al. ................. 370/335 |
| 6,122,270 A | 9/2000 | Whinnett et al. ........... 370/342 |
| 6,654,357 B1 * | 11/2003 | Wiedeman .................. 370/315 |
| 2002/0037726 A1 * | 3/2002 | Czaja et al. ................. 455/442 |

FOREIGN PATENT DOCUMENTS

| EP | 0954195 | 11/1999 | |
| GB | 2297460 | 7/1996 | |
| JP | 09271071 | 10/1997 | |
| JP | 0 949 835 A2 * | 4/1999 | ............ H04Q 7/38 |
| JP | 11163831 | 6/1999 | |
| WO | 9429981 | 12/1994 | |
| WO | 99 49609 | 5/1999 | |
| WO | 0074275 | 12/2000 | |

* cited by examiner

*Primary Examiner*—Alpus H. Hsu
*Assistant Examiner*—Jason Mattis
(74) *Attorney, Agent, or Firm*—McDonnell Boehnen Hulbert & Berghoff LLP

(57) ABSTRACT

A method for performing a handoff between an asynchronous base station and a synchronous base station. The method includes the steps of: a) setting at least one common channel between the synchronous base station and a mobile station; b) determining whether there is an asynchronous base station to be handed off in neighbor asynchronous base stations based on monitoring information of the neighbor asynchronous base stations; c) if there is no asynchronous base station, requesting a handoff to the synchronous base station and receiving a compressed mode message through the common channel; d) selecting a synchronous base station to be handed off based on the compressed mode message; and e) performing the handoff from the asynchronous base station to the synchronous base station.

10 Claims, 13 Drawing Sheets

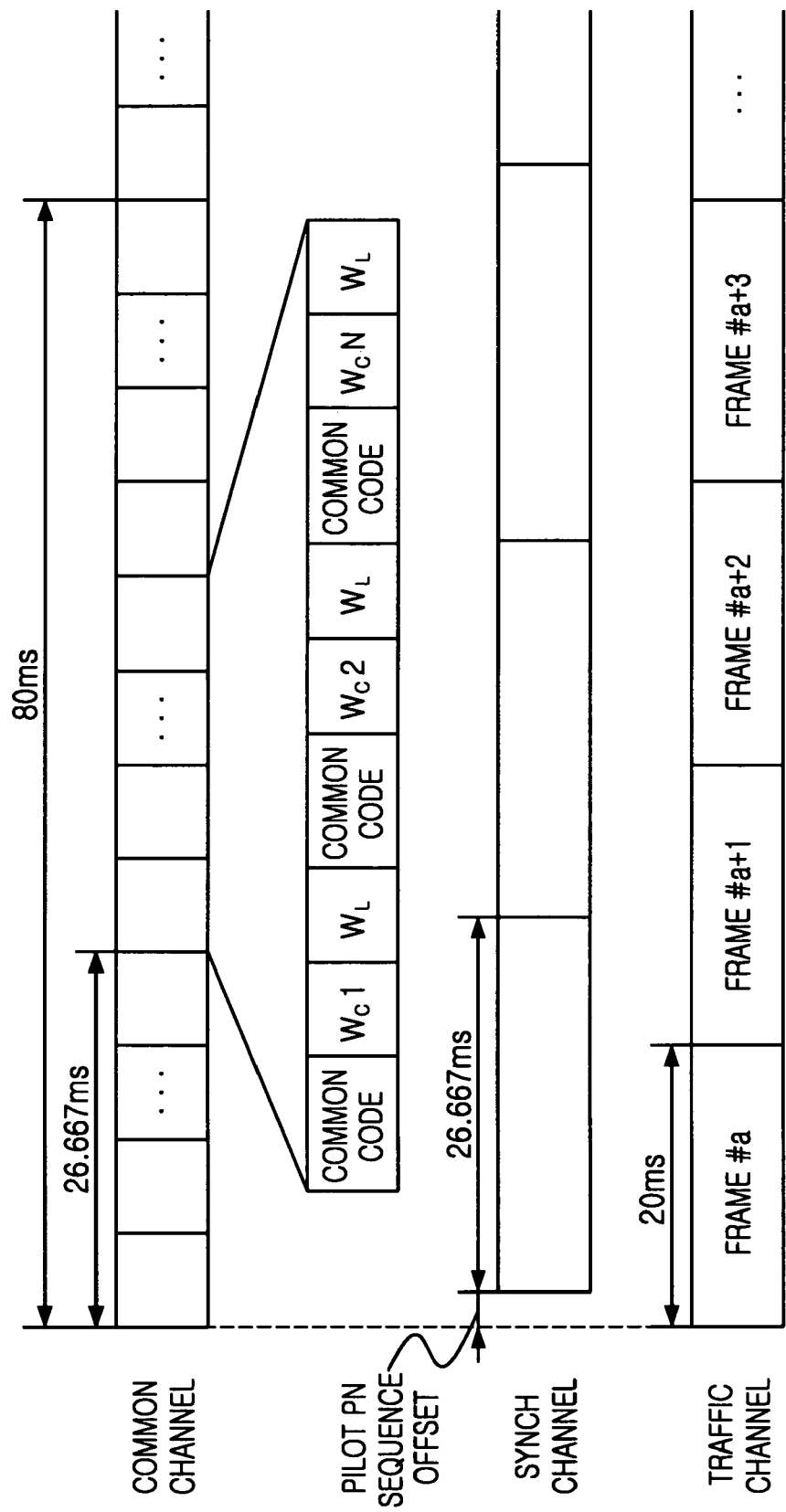

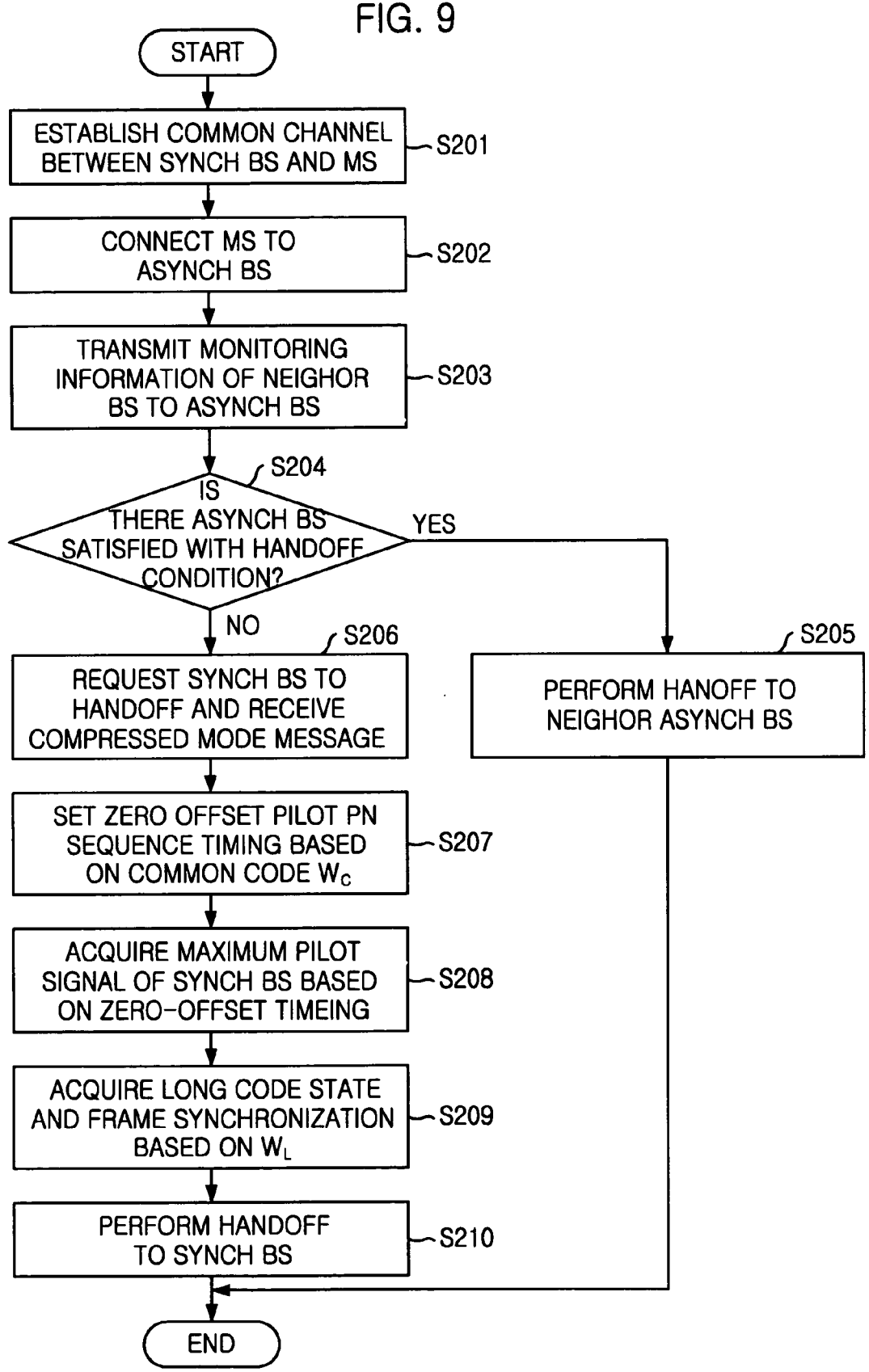

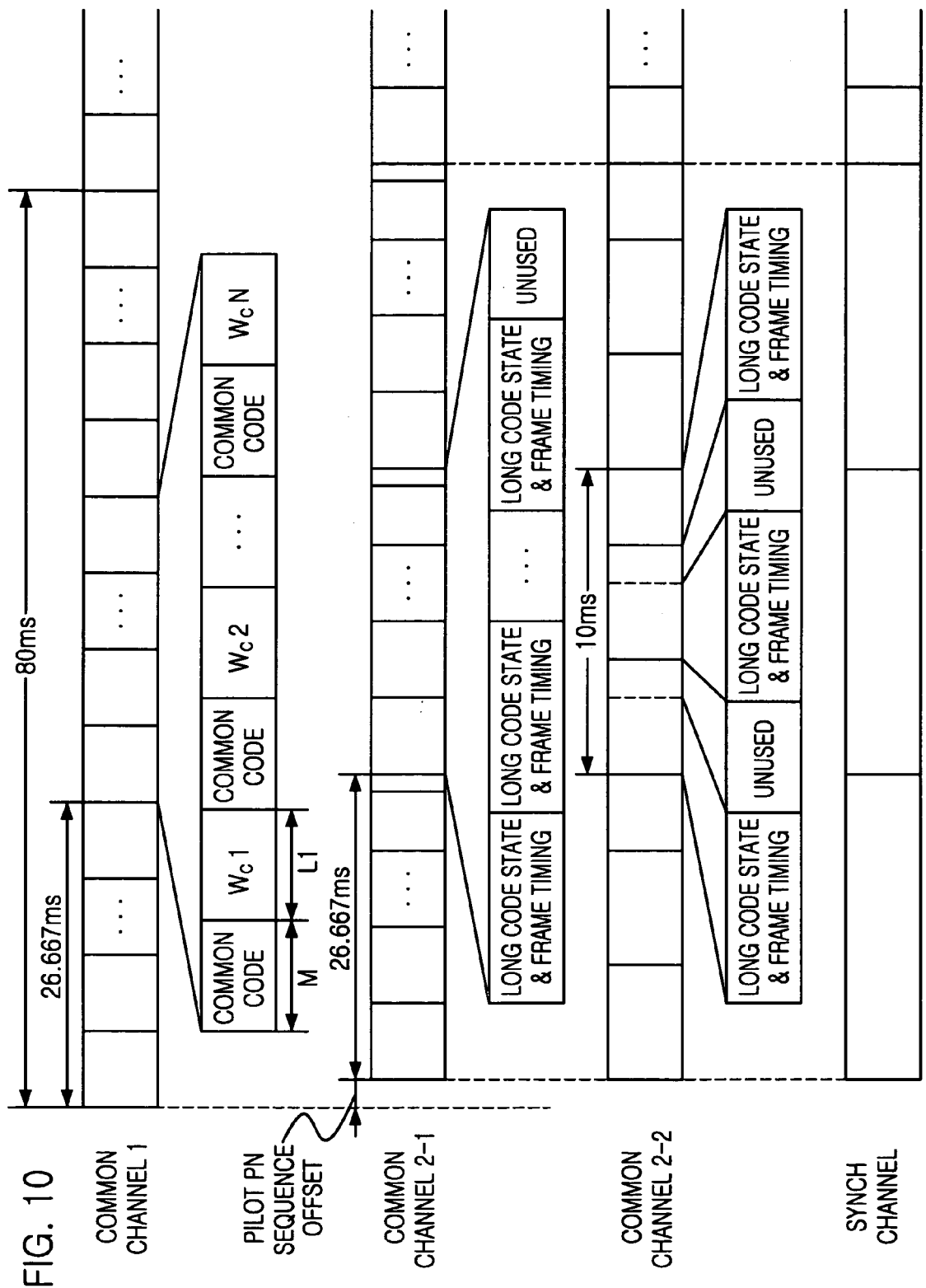

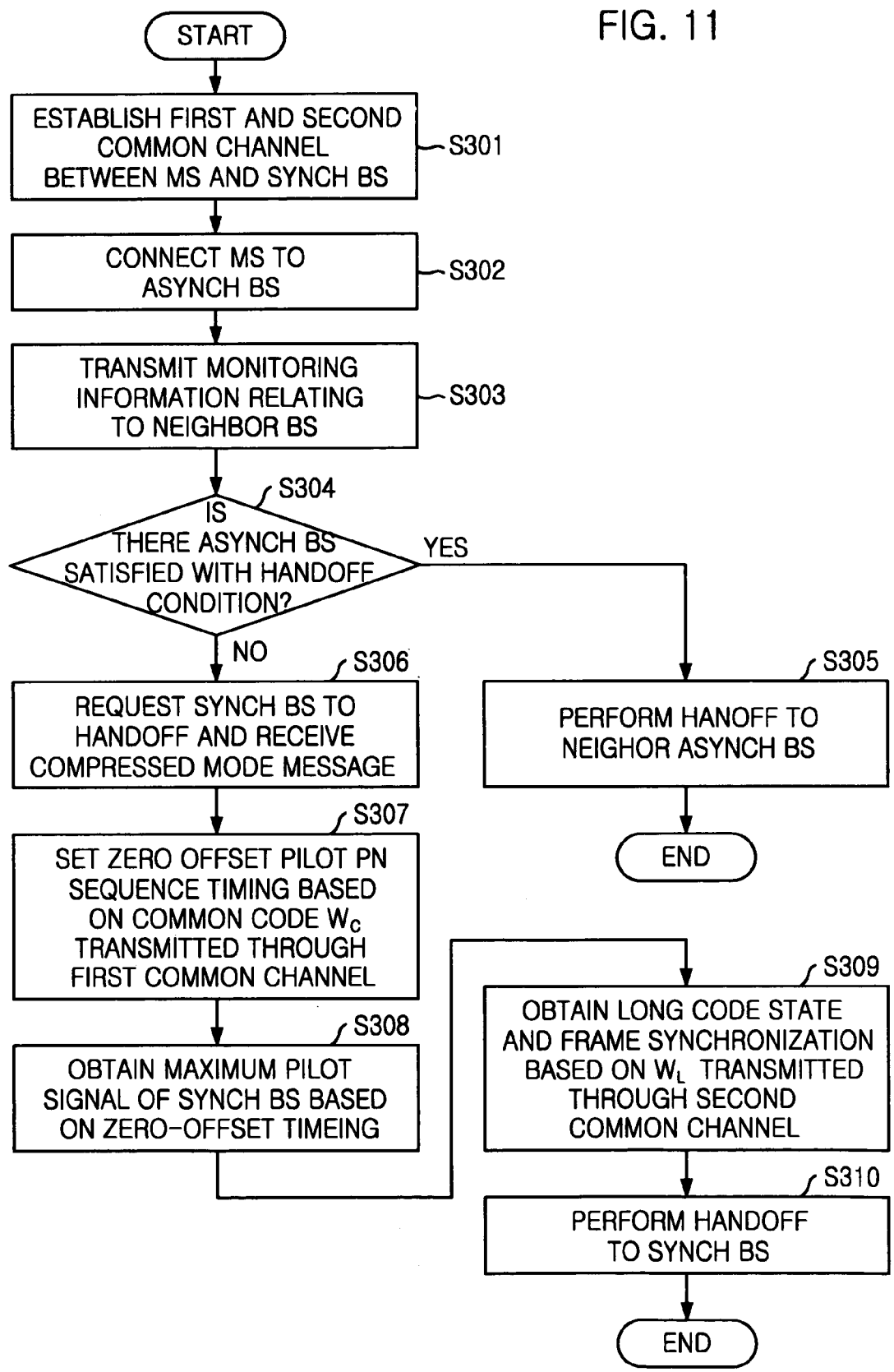

METHOD FOR PERFORMING HANDOFF BETWEEN ASYNCHRONOUS BASE STATION AND SYNCHRONOUS BASE STATION

FIELD OF THE INVENTION

The present invention relates to a method for performing a handoff in a mobile communication system; and, more particularly, to a method for performing a handoff between an asynchronous base station and a synchronous base station.

PRIOR ART OF THE INVENTION

A mobile communication service has been developed from a first generation which is based on an analog technology in years of 1980 to a second generation which is based on a digital technology in years of 1990. In the second generation mobile communication service, a range of the mobile communication service has been expanded from a transmission of a voice signal to various non-telephone services and data transmission service. Depending on an increase of subscribers, enlargement of a scope of activity, personalization and a request of multimedia, a demand for a mobile communication technique which can perform a roaming between different systems in a worldwide networks and transmit and receive various types of data becomes increased. In order to satisfy the demand, discussion of a standardization relating to a third generation mobile communication, which is referred to an international mobile telecommunication-2000 (IMT-2000), is being progressed.

In order to increase an efficiency of limited frequency resources, the mobile communication system divides a whole of service area into small service areas, each of which is referred to a cell, and provides a service based on the cell. At this time, in order to guarantee a mobility of a subscriber, though a mobile station of the subscriber moves out from a service cell, a communication channel between the mobile station and the base station is handed over to another base station, which is referred to a handoff. The handoff means that a new communication channel is assigned to a mobile station by a base station in a cell to which the mobile station moves, when the mobile station communicating with another base station moves from a cell to another cell.

In general, a mobile communication system is divided into a synchronous mobile communication system and an asynchronous mobile communication system. In a mobile communication system embodied for a commercial business, the synchronous mobile communication system interfaces data in accordance with a series of IS protocol, for example, IS-95, IS-41, IS-634, IS-2000, etc.; and the asynchronous mobile communication system interfaces data in accordance with a universal mobile telecommunication system Terrestrial Radio Access (UTRA) protocol. In this specification, the synchronous mobile communication system means a second-generation synchronous mobile communication system which is in service at present or a third-generation synchronous mobile communication system which will be in service. The asynchronous mobile communication system means a third-generation asynchronous mobile communication system, which is referred to a wide code division multiple access (W-CDMA) system, or an asynchronous IMT-2000 system.

If the asynchronous W-CDMA system starts to service in an area in which the synchronous mobile communication system provides a service, for efficiency, a handoff from the synchronous mobile communication system to the asynchronous mobile communication system is required. The handoff means that a new communication channel is assigned to a mobile station by a base station in a cell to which the mobile station moves.

In general the handoff method is divided into two methods, a hard handoff method and a soft handoff method.

The hard handoff method means that the communication channel between the mobile station and the base station communicating therewith is disconnected and then the new communication channel between the mobile station and the base station to be communicated therewith is connected, which is referred to a 'Break and Make' method. Using the hard handoff, a communication disconnection can occur.

The soft handoff method means that the new communication channel is connected before breaking the communication channel between the mobile station and the base station communicating therewith, which is referred to a 'Make and Break' method.

The IMT-2000 system has the four interface architectures. Therefore, the hybrid type synchronous mobile station must recognize an operating type of a core network currently connected thereto, and the hybrid type synchronous radio network should provide core network operating type information and others information to the hybrid type synchronous mobile station. The core network operating type information and the others information must be contained in the Sync channel message that the synchronous mobile station, after being powered on, receives through the Sync channel in a general interfacing manner.

Similarly, the hybrid type asynchronous mobile station must recognize an operating type of a core network currently connected thereto, and the hybrid type asynchronous radio network should provide the core network operating type information and others information to the hybrid type asynchronous mobile station. The core network operating type information and the others information must be contained in the system information message transmitted to the asynchronous mobile station, after being powered on, so that the asynchronous mobile station receives through the broadcast control channel (BCCH) in a general interfacing manner.

FIG. 1A is a view showing a synchronous ANSI-41 core network interface architecture of a synchronous radio network and a hybrid type asynchronous radio network. In this drawing, the reference numeral 100 denotes a dual mode mobile station, 110 a synchronous radio network, 120 a hybrid type asynchronous radio network, and 130 a synchronous ANSI-41 core network.

FIG. 1B is a view showing an asynchronous GSM-MAP core network interface architecture of a hybrid type synchronous radio network and an asynchronous radio network. In this drawing, the reference numeral 200 denotes a dual mode mobile station, 210 an asynchronous radio network, 220 a hybrid type synchronous radio network and 230 an asynchronous core network which includes a GSM-MAP network.

FIG. 1C is a view showing an asynchronous GSM-MAP core network interface architecture of a asynchronous radio network and a synchronous ANSI-41 core network interface architecture of a synchronous radio network. In this drawing, the reference numeral 300 denotes a dual mode mobile station, 310 denotes a asynchronous radio network, 320 denotes a synchronous radio network, 330 denotes an asynchronous core network which is connected to a UTRAN and 340 denotes a synchronous core network which is connected to a BSC.

In order to be operable adaptively to the above three interface architectures, a dual mode mobile station in the next-generation mobile telecommunications system can have both asynchronous CC and MM protocol entities serving for the GSM-MAP core network and synchronous CC and MM protocol entities serving for the ANSI-41 core network at the layer3 in the protocol stack structure, which is a different from each of the conventional synchronous and asynchronous mobile stations.

FIG. 2 is a diagram of cell structures in a mobile communication system when both of the synchronous base station and the asynchronous base station provide a service.

As shown in FIG. 2, since a third-generation asynchronous mobile communication system cannot provide a service in a whole area at the initial stage of the service, the asynchronous mobile communication system is neighbored to or included in the synchronous mobile communication system, for example, an interim standard-95 (IS-95) system, which provides a service at present. A plurality of the asynchronous cells 20, 30, 40, 50 and 60 each having an asynchronous base station 21, 31, 41, 51 or 61 are included in a synchronous cell 10 having a synchronous base station 11.

If a mobile station 75 communicating with the asynchronous base station 51 moves from the asynchronous cell to a boundary area of the synchronous cell 10 in which there is no asynchronous base station, a handoff from the asynchronous base station 51 to the synchronous base station 100 is required.

In case of the handoff from the asynchronous base station 51 to the synchronous base station 11, the handoff is performed in accordance with processes of the asynchronous mobile communication system. However, because of difference between the asynchronous mobile communication system and the synchronous mobile communication system, there is a problem in the handoff from the asynchronous base station to the synchronous base station.

Each of the synchronous mobile communication systems has the same timing based on a start time. A mobile station 75 obtains information relating to the start time and synchronizes with the synchronous mobile communication system. On the contrary, each of the asynchronous mobile communication systems does not have the same timing based on a start time.

Accordingly, when performing the handoff from the asynchronous base station to the synchronous base station, since the mobile station 75 does not have timing information of the synchronous mobile communication system, e.g., synchronization information and frame information of the synchronous mobile communication system, there is a problem in that the handoff cannot be performed.

When performing the handoff from the asynchronous base station 51 to a base station of another communication system, for example, a synchronous communication system, the handoff is performed in accordance with a compressed mode. The compressed mode is described with reference to FIG. 3.

FIG. 3 is a diagram illustrating a compressed mode transmission when performing a handoff from an asynchronous base station to a base station.

In order to perform a handoff an asynchronous base station to a synchronous base station, a mobile station should obtain information relating to the synchronous base station to be connected during an idle period. The information relating to the synchronous base station can be obtained from a forward synchronous channel, a pilot channel and a traffic channel transmitted from the synchronous base station.

FIG. 4 is a diagram illustrating pilot offsets of a forward synchronous channel in a synchronous base station.

For the handoff, a synchronization of the pilot signal, offsets of the base station, a super frame timing of a synchronous channel and a long code state of a traffic channel should be obtained. In order to minimize a call disconnection time, the mobile station can obtain the synchronization of the pilot signal, the offsets of the base station, the super frame timing of the synchronous channel and the long code state of the traffic channel during the compressed mode.

All of the base stations use a short code having a length of $2^{15}$ (26.667 ms) as a pilot code, and each base station is discriminated by an offset of the pilot code. Accordingly, when searching a synchronization of the pilot code in the compressed mode, since whole of one period of the pilot code, 26.667 ms, should be searched, there is a problem in that it takes a lot of time to search the synchronization of the pilot code.

In order to obtain the zero offset and the long code states used in a traffic channel and a paging channel, a super frame of the synchronous channel should be demodulated. Since a period of the super frame is 80 ms, there is problem in that it takes a lot of time to demodulate the super frame. Accordingly, it takes a lot of time to perform the handoff from the asynchronous base station to the synchronous base station; in worst case, the handoff cannot be performed.

SUMMARY OF THE INVENTION

Therefore, it is an object of the present invention to provide a method for performing a handoff from an asynchronous base station to a synchronous base station.

It is another object of the present invention to provide a method for performing a handoff from an asynchronous base station to a synchronous base station within a short time.

In accordance with an aspect of the present invention, there is provided a method for performing a handoff from an asynchronous base station to a synchronous base station, comprising the steps of: a) setting at least one common channel between the synchronous base station and a mobile station; b) determining whether there is an asynchronous base station to be handed off in neighbor asynchronous base stations based on monitoring information of the neighbor asynchronous base stations; c) if there is no asynchronous base station, requesting a handoff to the synchronous base station and receiving a compressed mode message from RRC; d) selecting a synchronous base station to be handed off using the information of common channel; and e) performing the handoff from the asynchronous base station to the synchronous base station.

BRIEF DESCRIPTION OF THE DRAWINGS

The above and other objects, features and advantages of the present invention will be more clearly understood from the following detailed description taken in conjunction with the accompanying drawings, in which:

FIG. 8 a timing diagram of a common channel, a synchronous channel and a traffic channel applied to a method for performing the handoff in accordance with one embodiment of the present invention;

FIG. 9 is a flow chart illustrating a method for performing a handoff between a synchronous base station and an asynchronous base station in accordance with one embodiment of the present invention;

FIG. 10 a timing diagram of a common channel, a synchronous channel and a traffic channel applied to a method for performing the handoff in accordance with another embodiment of the present invention; and FIG. 11 is a flow chart illustrating a method for performing a handoff between a synchronous base station and an asynchronous base station in accordance with another embodiment of the present invention.

PREFERRED EMBODIMENTS OF THE INVENTION

Hereinafter, preferred embodiments of the present invention will be described in detail referring to the accompanying drawings.

In the present invention, in order to obtain information relating to the synchronous mobile communication system, an additional common channel is established. Zero offset timing, long code states and a super frame timing of the synchronous channel are continuously broadcasted through the common channel.

Embodiment 1

Figure 1A:
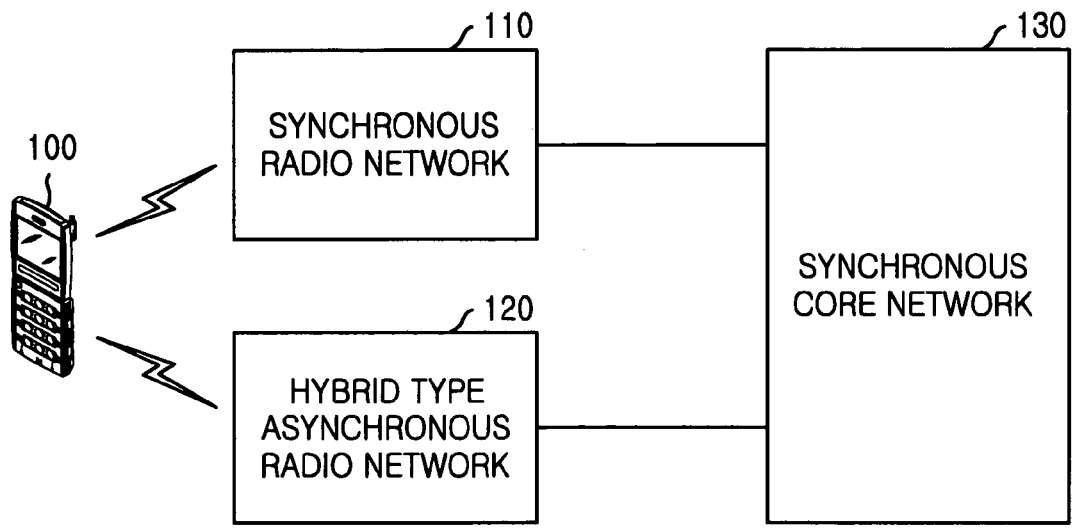
FIG. 1A is a view showing a synchronous ANSI-41 core network interface architecture of a synchronous radio network, a hybrid type asynchronous radio networks and dual mode mobile station.
Figure 1B:
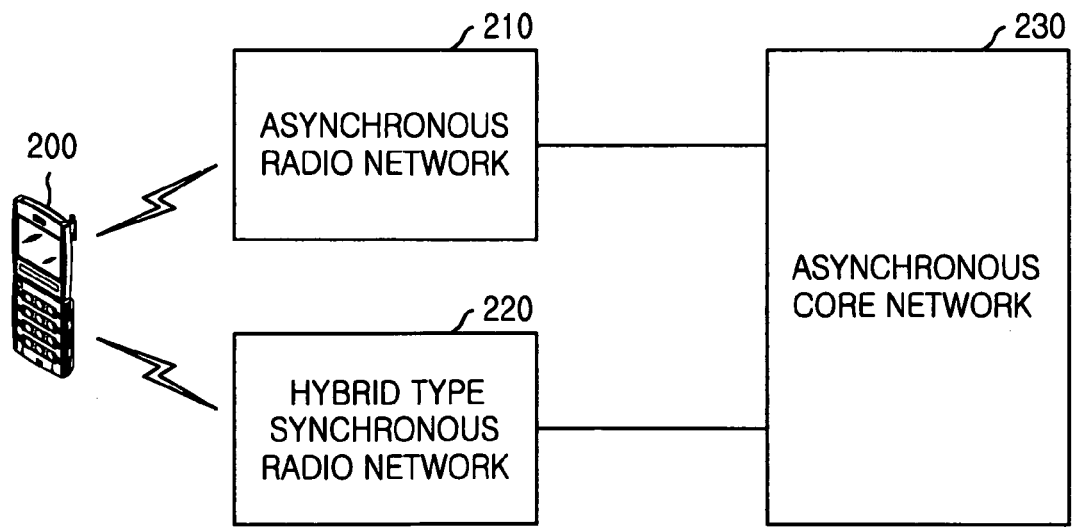
FIG. 1B is a view showing an asynchronous GSM-MAP core network interface architecture of a hybrid type synchronous radio network, an asynchronous radio network and dual mode mobile station.
Figure 1C:
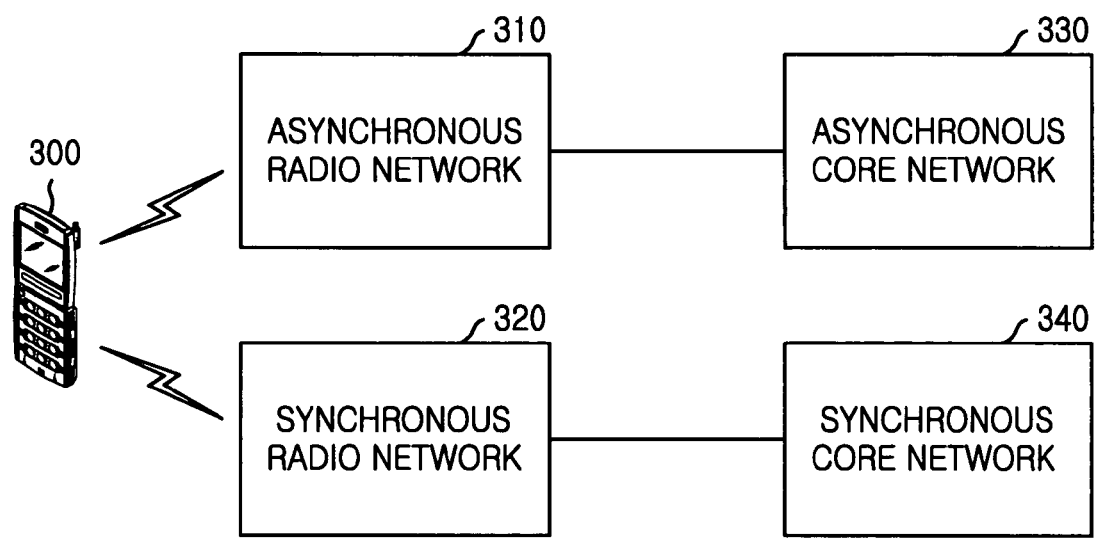
FIG. 1C is a view showing an asynchronous GSM-MAP core network interface architecture of asynchronous radio network and synchronous ANSI-41 core network interface architecture of synchronous radio network and dual mode mobile station.
Figure 2:
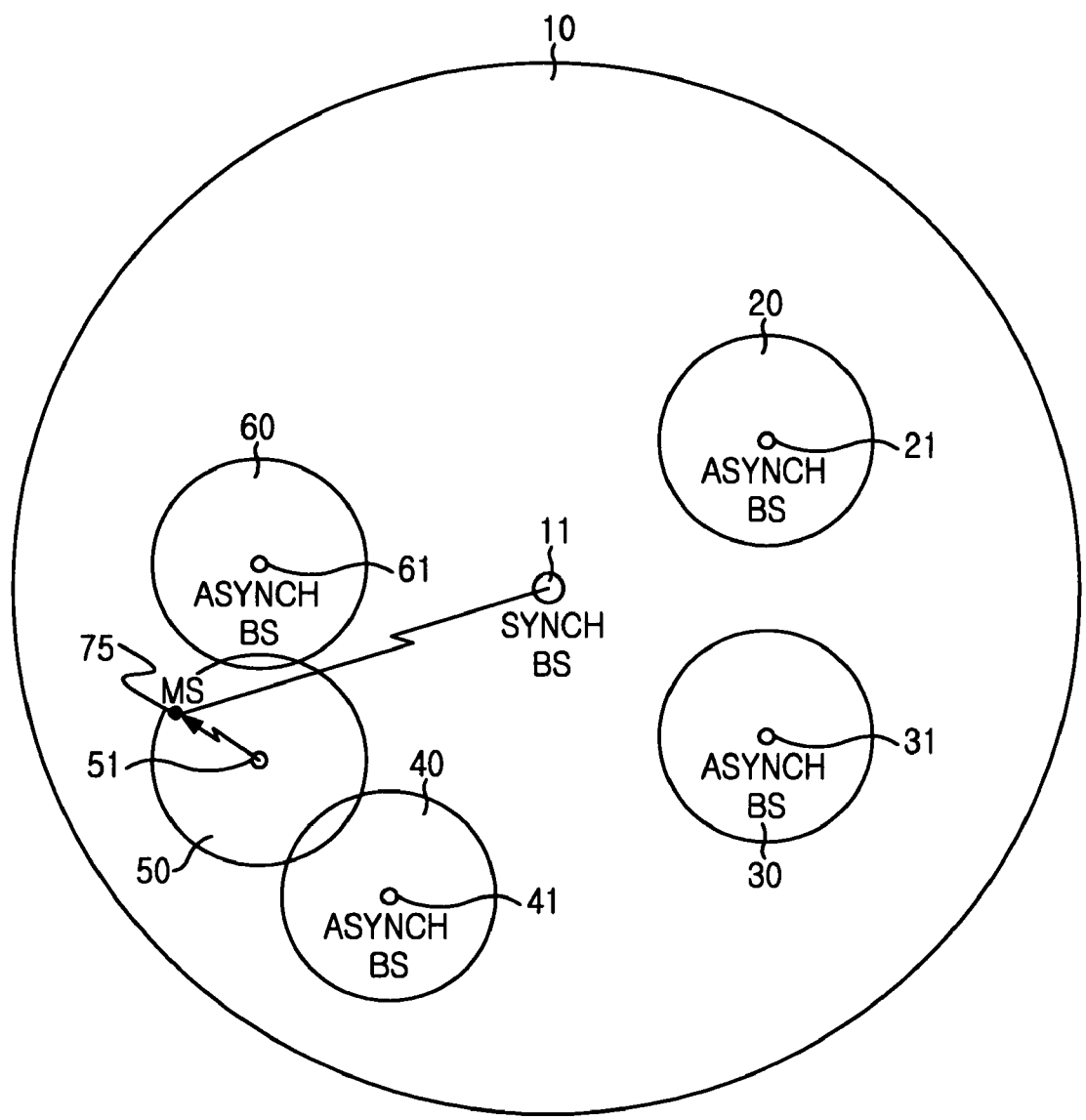
FIG. 2 is a diagram of cell structures in a mobile communication system.
Figure 3:
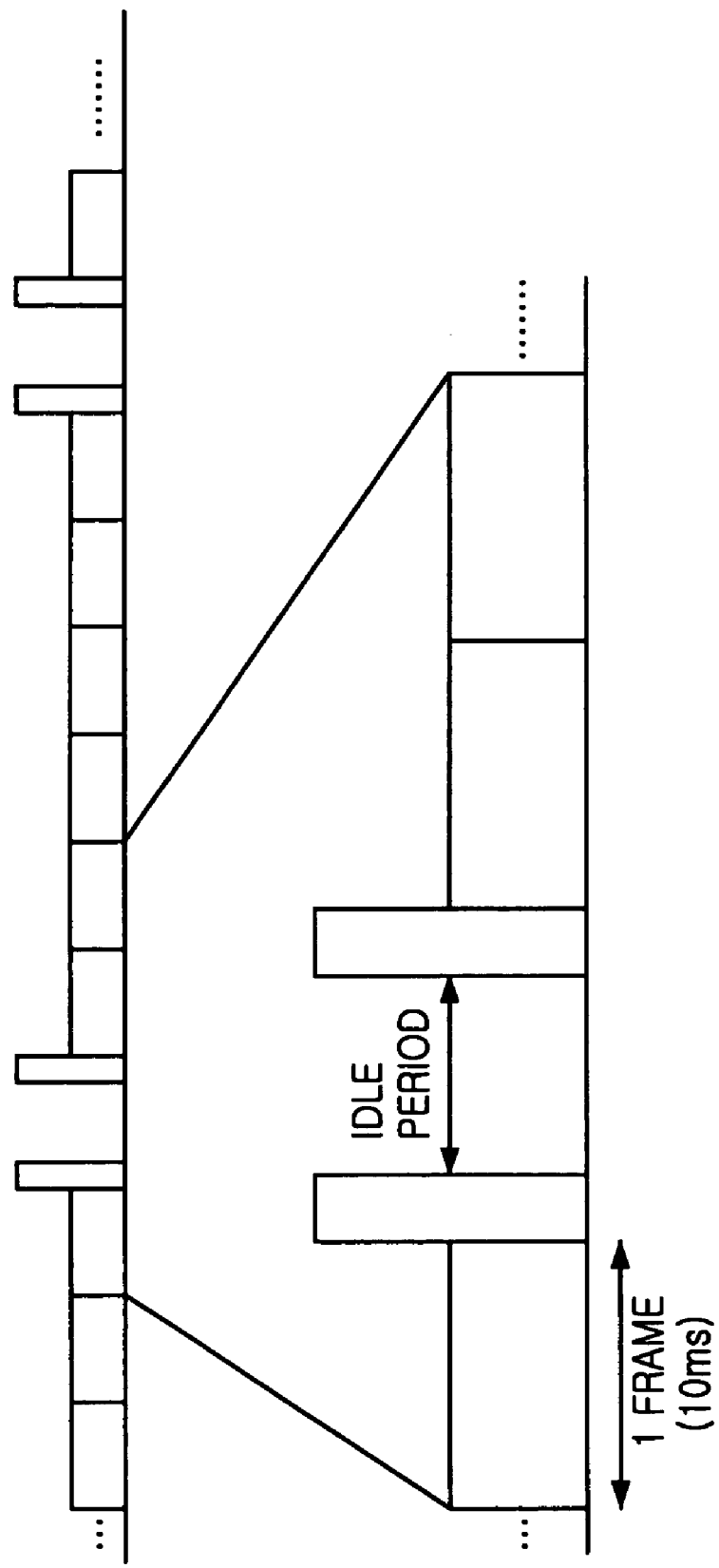
FIG. 3 is a diagram illustrating a compressed mode transmission when performing a handoff from an asynchronous base station to a base station.
Figure 4:
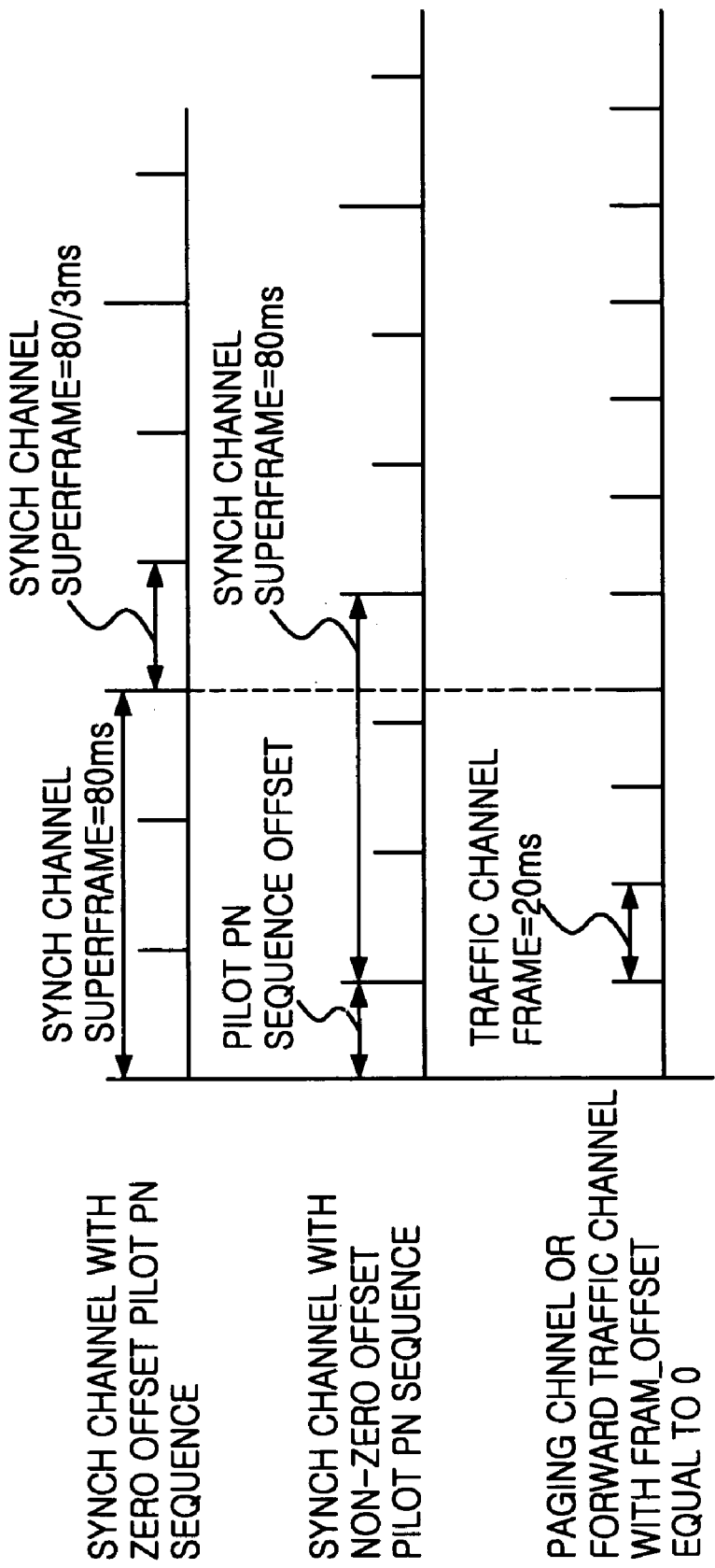
FIG. 4 is a diagram illustrating pilot offsets of a forward synchronous channel in a synchronous base station.
Figure 5:
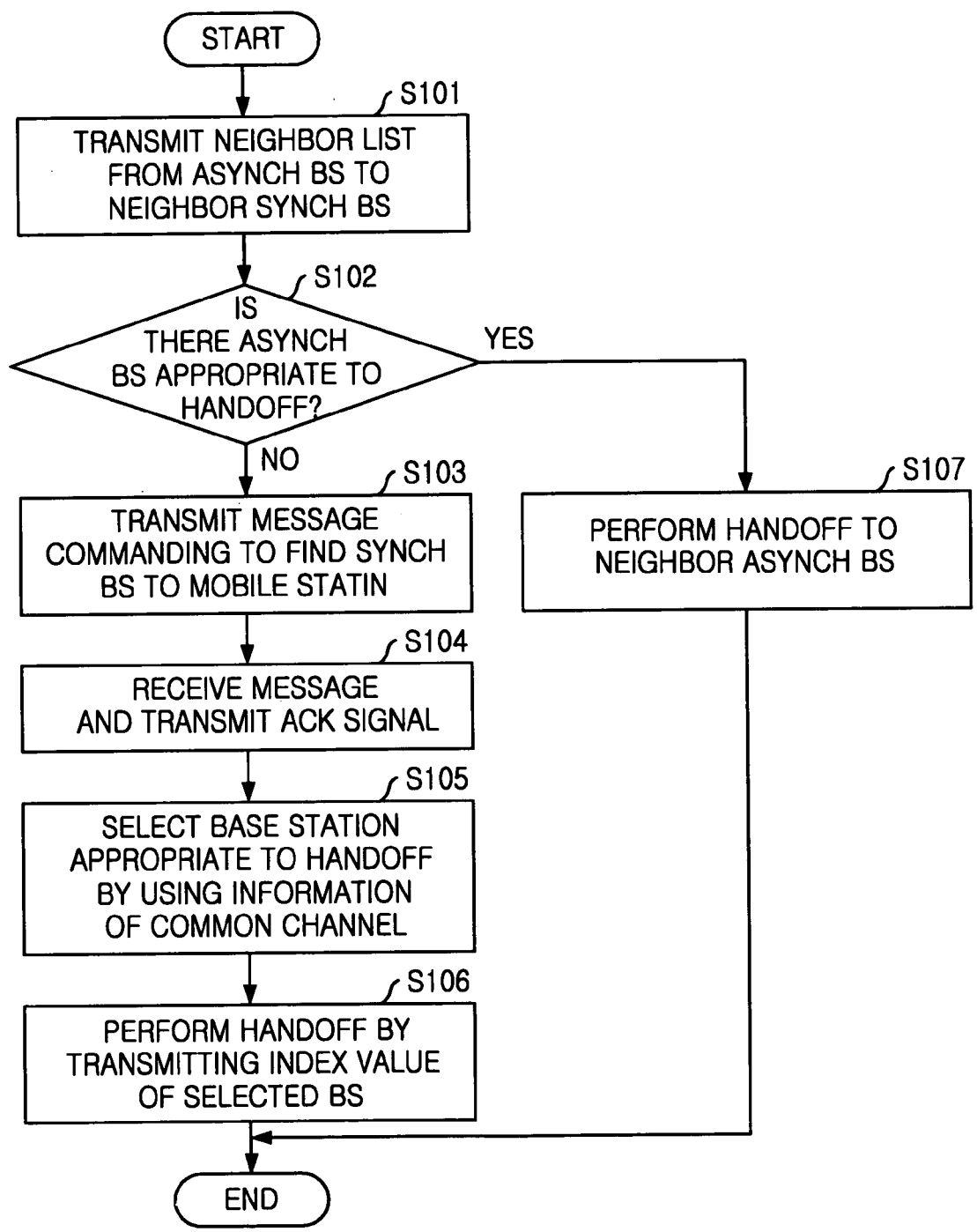
FIG. 5 is a flow chart illustrating a method for performing a handoff from an asynchronous base station to a synchronous base station.

FIG. 5 is a flow chart illustrating a method for performing a handoff from an asynchronous base station to a synchronous base station.

An asynchronous base station transmits a neighbor list containing information about neighbor base stations to a mobile station at step S101. The neighbor list is transmitted as a radio resource control (RRC) message. However, since the neighbor list is not defined in conventional RRC messages, the neighbor list is a message generated by newly defining or modifying a conventional RRC message.

It is determined whether there is an asynchronous base station appropriate to be handed over based on the information received from the mobile station at step S102. If there is an appropriate asynchronous base station, a handoff to the appropriate asynchronous base station is performed at step S107.

If not, the asynchronous base station transmits a search request RRC message commanding to find a synchronous base station to be handed over at step S103. Since the search request RRC message is not defined in conventional RRC messages, the search request message should be generated by newly defining or modifying a conventional RRC message. At this time, the mobile station operates in a compressed mode and obtains information relating to the synchronous base station.

The mobile station transmits an acknowledgement message response to the search request RRC message to the asynchronous base station at step S104. Since the acknowledgement message is not defined in conventional RRC messages, the acknowledgement message should be generated by newly defining or modifying a conventional RRC message.

The mobile station monitors and processes the information broadcasted through the common channel. Then, the mobile station obtains a zero offset pilot pseudo noise (PN) sequence timing, long code state and a frame synchronization of the synchronous base station, thereby selecting a synchronous base station which is most appropriate to be handed over at step S105. In this specification, reference values are not limited in detail. The mobile station can select a base station to be handed over by searching pilot offsets corresponding to base stations in the neighbor list after obtaining zero offset timing information.

The mobile station transmits an index message of the synchronous base station appropriate to be handed over to the asynchronous base station. The asynchronous base station transmits a command for the handoff to the selected synchronous base station. The index message of the synchronous base station has a format of a RRC message. Since the index message of the synchronous base station is not defined in conventional RRC messages, the index message of the synchronous base station should be generated by newly defining or modifying a conventional RRC message.

In detail, when performing the handoff, a source asynchronous base station transmits a handoff required message to the MSC, the MSC transmits a handoff request message to a target synchronous base station. When receiving the handoff request message, the call is handed over to the target synchronous base station. FIG. 5 is a flow chart illustrating a call flow for performing a handoff from an asynchronous base station to a synchronous base station in case of ANSI-41 core networks.

Figure 6A:
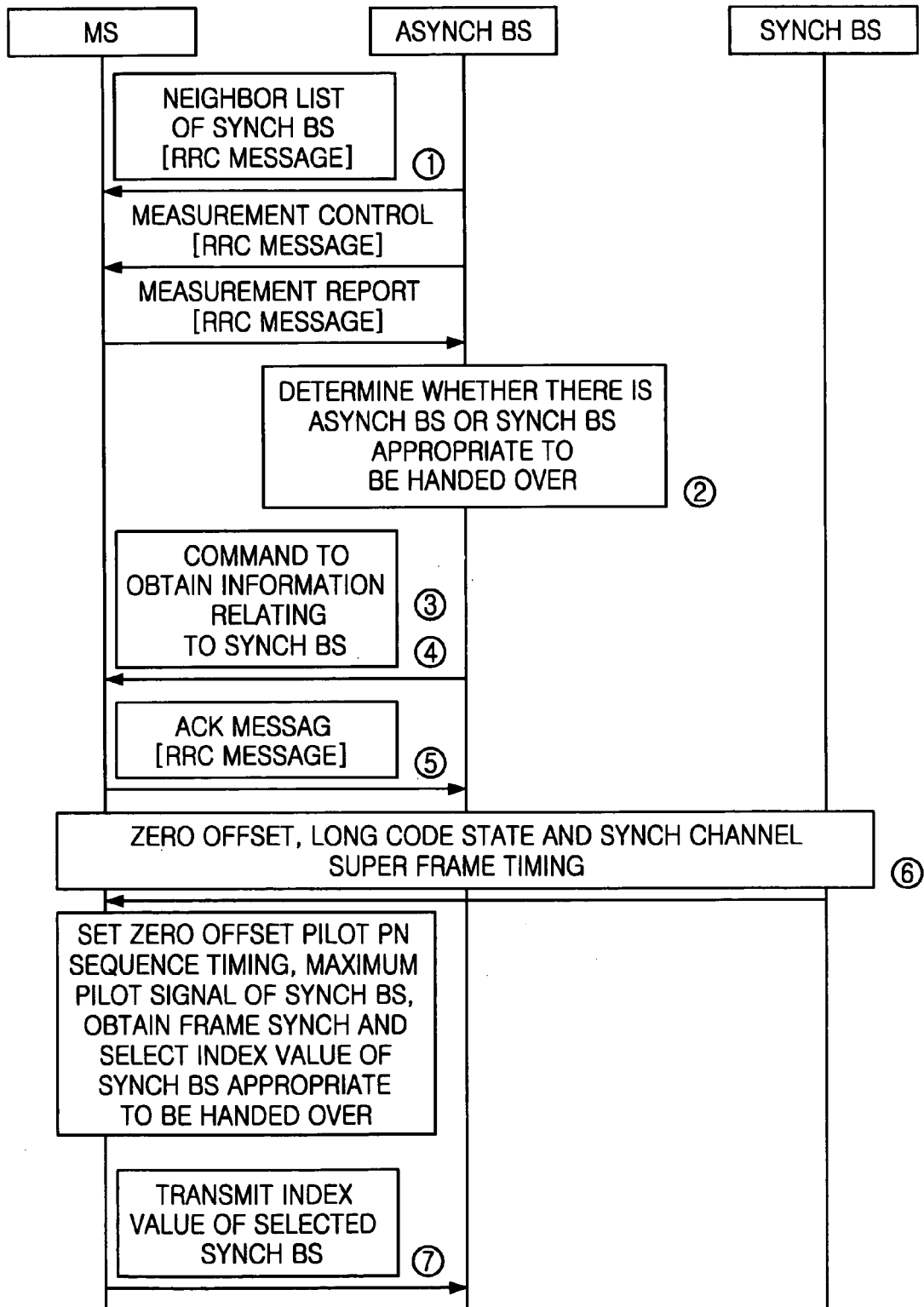
FIGS. 6A and 6B are a flow chart illustrating a call flow for performing a handoff from an asynchronous base station to a synchronous base station in case of ANSI-41 core network.
Figure 6B:
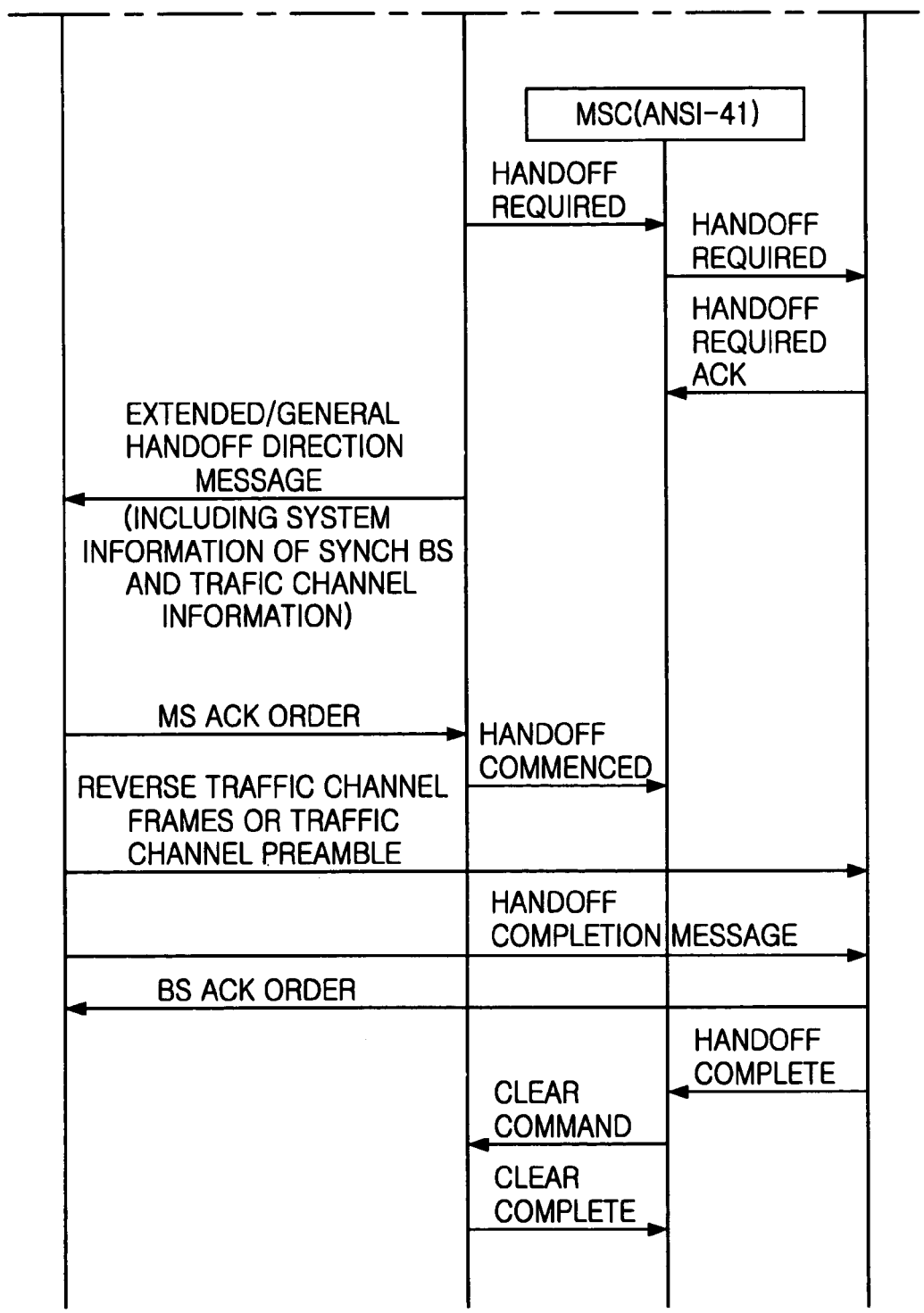

The handoff method illustrated in FIGS. 6A and 6B is similar to those as mentioned above with reference to FIG. 5, therefore, for convenience, detailed descriptions will be skipped.

Embodiment 2

Figure 7:
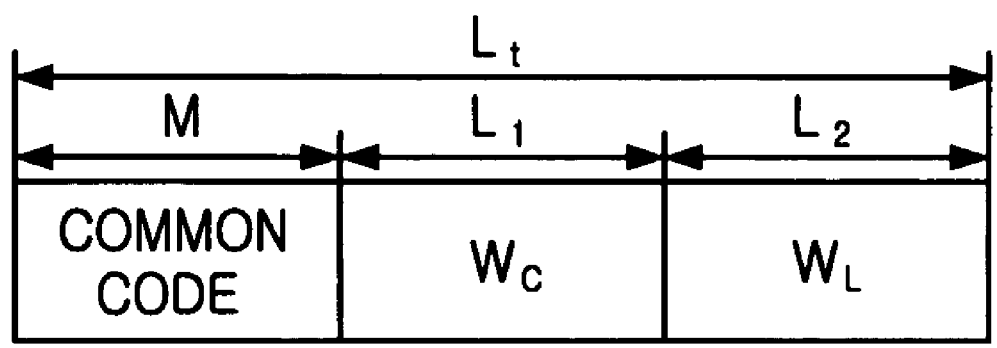
FIG. 7 is a diagram showing a period of a common channel applied to a method for performing a handoff between a synchronous base station and an asynchronous base station in accordance with the present invention.

FIG. 7 is a diagram showing a period of a common channel applied to a method for performing a handoff between a synchronous base station and an asynchronous base station in accordance with the present invention.

A mobile station communicating with an asynchronous base station searches information relating to a synchronous base station in a compressed mode when there needs a handoff to the synchronous base station. A common channel is used for informing the mobile station of the information relating to the synchronous base station. The synchronous base station transmits its timing information, i.e., a zero offset, a long code state and a synchronous channel super frame timing of the synchronous base station through the common channel.

Each synchronous base station neighboring to the asynchronous base station transmits the same value through the common channel of which structure is illustrated in FIG. 8.

The common channel includes a common code, a zero offset indicator code $W_c$ and a long code indicator code $W_L$.

The common code is repeated in order to obtain a timing of the synchronous base station. $W_c$ represents a zero offset from an obtained timing. $W_L$ represents the long code state and the synchronous channel super frame information.

In other words, the common code is periodically repeated N (N is an integer) times from a start point of the zero offset during one frame of the pilot channel, i.e., 26.667 ms. A length of the common code is M is illustrated in FIG. 7.

The Walsh code $W_c$ follows the common code, thereby representing relation between a timing of the common code and the start point of the zero offset. The first common code is followed by the first Walsh code $W_c1$, and the second common code is followed by the second Walsh code $W_c2$. A length of the Walsh code $W_c$ is L1, which depends on the number N of repeat of the common code. For example, as assume that the number N of repeat of the common code from the start point of the zero offset for one frame is 64, the Walsh code $W_c$ is 64. If the number N is 32, the Walsh code $W_c$ is 32.

The $W_L$ represents the long code state and the synchronous channel super frame information. A length L2 of the $W_L$ is constant for one frame of the pilot channel. The length of the long code state is 41 bits and a length of the super frame timing of the synchronous channel is 2 bits. In other words, an N-ary orthogonal modulation method is used.

For example, if the length of the Walsh code is 16 bits, it is referred to a 16-ary orthogonal modulation method. In the 16-ary orthogonal modulation method, the Walsh codes represent 4 bits as following: Walsh code 0=0000; Walsh code 1=0001; Walsh code 2=0010; . . . Walsh code 15=1111. In order to represent 43 bits, eleven Walsh codes are needed. Accordingly, if the length L2 of the $W_L$ is 256, 64 bits can be represented. The rest bits, 17 bits can be used for error detection or error correction.

If the length L2 of the $W_L$ is larger than 256, an orthogonal modulation having a larger value than 16-ary can be performed.

FIG. 8 a timing diagram of a common channel, a synchronous channel and a traffic channel applied to a method for performing the handoff in accordance with one embodiment of the present invention.

As shown in FIG. 8, since the common channel starts to transmit in synchronization with the start point of the pilot channel, a frame timing of the common channel is equal to that of the traffic channel.

Hereinafter, a method for transmitting and receiving information through a common channel will be described.

All of base stations transmit information necessary to the handoff through the common channel. Since one period of the pilot channel is 26.667 ms and if N is 64, one period $L_t$ of the common channel is 512. At this time, it is assumed that an idle period of the compressed mode is 8 ms, 64×(8/26,667)≈19. Accordingly, the common channel is repeated 19 times during the idle period.

One period of the common channel can be expressed by a set of lengths M, L1 and L2 of codes. For example, if M is 128, L1 is 128 and L2 is 256, i.e., M=128, L1=128 and L2=256, N is 64, one period $L_t$ of the common channel can be expressed by common code (128), $W_c n$ . . . $W_c n$ (64×2), $W_L$ (256).

If N is 32, one period $L_t$ of the common channel is 1024 and the common channel is repeated 9 times during the idle period of the compressed mode. In other words, 32×(8/26, 667)9. Accordingly, a code set of the common channel includes M=256, L1=256 and L2=512. One period of the common channel includes common code (256), $W_c n$, $W_c n$, $W_c n$, $W_c n$, $W_c n$, $W_c n$, $W_c n$, $W_c n$, (32×8), $W_L$ (256×2). In other words, iteration number N, the lengths of the codes M, L1 and L2 can be selected in accordance with system environments and a buffer capability.

First, a receiver of the mobile station searches a synchronization based on the common code, stores one period of the common code because the common code is repeated multiple times. Then, the receiver of the mobile station finds a maximum value by accumulating an output value.

For example, if the common code is repeated 19 during a idle period, i.e., 14 times of the common code are used for searching the common code, a maximum value is selected by accumulating 14 times of the common channels. After selecting the maximum value, the zero offset is selected by using the Walsh code $W_c$. In other words, the maximum value of the Walsh code $W_c$ is 10. The synchronization which is set at present is 10 periods away from the zero offset.

When the maximum value is selected by using the repeated Walsh code $W_c$, the Walsh code $W_c$ can be verified. For example, if the iteration number N is 64, the Walsh code $W_c$ is repeated two times for one period of the common channel, five (5) periods of the Walsh code $W_c$ are used in the compressed mode. If the common code is tenth value from the zero offset and there is no error in the common code, the received values should be $W_c 10$, $W_c 10$, $W_c 11$, $W_c 11$, $W_c 12$, $W_c 12$, $W_c 13$, $W_c 13$, $W_c 14$ and $W_c 14$. In case that a maximum value is selected in output values, each output value is a value obtained by summing one period of the Walsh codes $W_c$, the received values should be $W_c 10$, $W_c 11$, $W_c 12$, $W_c 13$ and $W_c 14$. In other words, a timing error can be recognized by setting an allowable error.

The mobile station obtaining the zero offset timing searches the pilot channel of synchronous base stations within neighbor lists and selects the base station having a maximum value in the pilot signal.

After obtaining the base station to which the mobile station belongs, the mobile station demodulates the Walsh code $W_L$ and obtains the long code state and the synchronous channel super frame synchronization. The Walsh code $W_L$ has the same value and is repeated multiple times for one period of the pilot channel. For example, if the iteration number N is 64, the Walsh code $W_L$ is repeated at most 19 times. After selecting the maximum value in the output values generated by accumulating the Walsh codes $W_L$ or deciding each of the output values, a correct received value can be obtained by selecting most frequent value.

FIG. 9 is a flow chart illustrating a method for performing a handoff between a synchronous base station and an asynchronous base station in accordance with the present invention.

First, a common channel between a synchronous base station and a mobile station is established at step S201. The mobile station is connected to the asynchronous mobile station at step S202. Monitoring information of neighbor base stations is transmitted to the asynchronous base station at step S203. It is determined whether there is an asynchronous base station satisfied with a handoff condition at step S204. If there is the asynchronous base station performing the handoff, the handoff to the neighbor asynchronous base station is performed at step S205. If not, the mobile station requests a handoff to the synchronous base station and after receiving a compressed mode message from RRC, the mobile station operates a compressed mode at step S206. The compressed mode message informs the mobile station that a length and a period of an idle period.

The mobile station sets a zero offset and a pilot pseudo noise (PN) sequence timing based on a common code and a Walsh code $W_c$ at step S207. After obtaining the zero offset timing information, a synchronous base station having a maximum pilot signal is set as the synchronous base station to be communicated with by searching only corresponding pilot offsets in list of the neighbor base station at step S208. In other words, the maximum pilot signal is obtained by using the zero offset timing set at the step S207. Here, the mobile station should have not only the lists of the neighbor asynchronous base station but also those of the synchronous base station.

A long code state and a frame synchronization are acquired by using a Walsh code $W_L$ at step S209. The handoff to the synchronous base station is performed at step S210.

The mobile station should obtain timing information of the synchronous base station, the strongest cell selection using the pilot offsets according to neighbor lists and the long code state used in the traffic channel during the idle period of the compressed mode.

In order to obtain information necessary to the handoff within the idle period, an additional common channel is set and transmitted to all of asynchronous base stations neighbor to the synchronous base station. According to the zero offset timing information, the long code state and the super frame timing information of the synchronous channel received from the synchronous base station through the common channel, the handoff from the asynchronous base station to the synchronous base station can be performed.

Therefore, since the long code state can be obtained without demodulation of the synchronous channel of the synchronous base station, there is an advantage in that the time for the handoff can be reduced to a minimum value.

Embodiment 3

This embodiment is similar to the first embodiment, except that two common channel is used for transmitting information relating to timing information of a synchronous base station to a mobile station. In other words, the synchronous base station transmits the zero offset information through a first common channel and the long code state information and the synchronous channel super frame timing through a second common channel.

FIG. 10 a timing diagram of a common channel, a pilot channel and a synchronous channel applied to a method for performing the handoff in accordance with another embodiment of the present invention.

As shown in FIG. 11, the same information is transmitted from each base station through the first common channel with reference to the zero offset timing. The second common channel uses the same codes as the pilot channel and a start point of the second common channel is equal to that of the pilot channel, then the second common channel is orthogonal to the traffic channel.

Hereinafter, a method for transmitting and receiving information through a common channel will be described.

All of base stations transmit information necessary to the handoff through the first common channel. Structure and timing of the first common code are illustrated in FIG. 11. The first common channel has a common code and a Walsh code $W_c$. The common code is repeated in order to obtain timing of the synchronous base station. The Walsh code $W_c$ represents a zero offset from the obtained timing.

The common code is periodically repeated N (N is a natural number) times for one frame of the pilot channel and the length of the common code is M (M is a real number).

The Walsh code $W_c$ follows the common code, thereby representing relation between a timing of the common code and the start point of the zero offset. The first common code is followed by the first Walsh code $W_{c1}$, and the second common code is followed by the second Walsh code $W_{c2}$. A length of the Walsh code $W_c$ is L1, which depends on the number N of repeat of the common code. For example, as assume that the number N of repeat of the common code from the start point of the zero offset for one frame is 64, the Walsh code $W_c$ is 64. If the number N is 32, the Walsh code $W_c$ is 32.

The second common channel represents a long code state and super frame timing information of synchronous channel which are used in the traffic channel. Accordingly, a length of the second common channel is constant for one frame of the pilot channel. The length of the long code state is 41 bits and a length of the timing information of the synchronous channel is 2 bits.

The second common channel is largely divided into two types. When compressed mode is operated to fixed position, a common channel 2-1 uses and when compressed mode is operated to adjust position, a common channel 2-2 uses as shown in FIG. 11. In case of the common channel 2-1, the long code state is transmitted during a communication time between the mobile station and the asynchronous base station. Accordingly, it is necessary that there are two or more long code states during an idle period, an error check code, for example, eight (8) bits cyclic redundancy check (CRC) code, is added and N-ary orthogonal modulation method is used.

For example, since a length of the Walsh code, in this embodiment 64, can be expressed by six (6) bits, for expressing 51 bits, nine Walsh codes are necessary. In other words, using 64-ary orthogonal modulation Walsh code 0="000000"
Walsh code 1="000001"
Walsh code 2="000010"
. . .
Walsh code 63="111111"

On the contrary, in the common channel 2-2, the idle period can be adjusted. The long code state can transmitted during the idle period. Accordingly, it is enough that there is only one long code state during the idle period.

Therefore, the N-ary orthogonal modulation is not necessary and the long code state can be transmitted without additional hardware, e.g., an N-ary orthogonal modulator.

For example, if a maximum gap length of the idle period is 8 ms, a period of the pilot signal is 26.667 ms and a period of a frame is 10 ms, the long code state can be transmitted at least two times.

Each base station transmits the same information necessary to hand off through the first and the second common channel.

Since one period of the pilot channel is 26.667 ms, one period $L_t$ of the first common channel is repeated N times.

If the N is 32, a period of the first common channel, i.e., the common code and the Walsh code $W_c$, is 1024. At this time, it is assumed that an idle period of the compressed mode is 8 ms, 32×(8/26,667)≈9.

One period of the first common channel can be expressed by a set of lengths M and L1 of codes. For example, if M is 256, L1 is 768 and N is 32, i.e., the nth M=256 and L1=768, N is 32, one period $L_t$ of the first common channel can be expressed by common code (256), $W_c$n . . . $W_c$n (32×24).

If N is 64, one period $L_t$ of the common channel is 512 and the first common channel is repeated 64 times during the idle period of the compressed mode. Accordingly, a code set of the common channel includes M=256 and L1=256. One period of the common channel includes common code (256), $W_c$n, $W_c$n, $W_c$n, $W_c$n (64×4). In other words, iteration number N, the lengths of the codes M and L1 can be selected in accordance with system environments and a buffer capability.

First, a receiver of the mobile station searches a synchronization based on the common code, stores one period of the common code because the common code is repeated multiple times. Then, the receiver of the mobile station finds a maximum value by accumulating an output value.

For example, if the period of common channel is repeated 32 times in one period of pilot channel, i.e., the iteration number is 32 and 4 periods of the common code are used for searching the maximum value at one period of common channel, a maximum value is selected by accumulating 4 times of the common channels. After selecting the maximum value, the zero offset is selected by using the Walsh code $W_c$. In other words, the maximum value of the Walsh code $W_c$ is 10. The synchronization which is set at present is 10 periods away from the zero offset.

When the maximum value is selected by using the repeated Walsh code $W_c$, the Walsh code $W_c$ can be verified. For example, if the iteration number N is 64, the Walsh code $W_c$ is repeated four times for one period of the common channel, four (4) periods of the Walsh code $W_c$ are used in the compressed mode. If the common code is tenth value from the zero offset and there is no error in the common code, the received values should be $W_c$10, $W_c$10, $W_c$10, $W_c$10, $W_c$11, $W_c$11, $W_c$11, $W_c$11, $W_c$12, $W_c$12, $W_c$12, $W_c$12, $W_c$13, $W_c$13, $W_c$13, and $W_c$13. In case that a maximum value is selected in output values, each output value is a value obtained by summing one period of the Walsh codes $W_c$, the received values should be $W_c$11, $W_c$11, $W_c$12, and $W_c$13. In other words, a timing error can be recognized by setting an allowable error.

The mobile station obtaining the zero offset timing searches only lists of neighbor base stations of the synchronous base station and a pilot offset in the lists, thereby selecting a base station having a maximum value in the pilot signal.

After obtaining the pilot channel of the base station to which the mobile station belongs, the mobile station demodulates information transmitted through the second common channel and obtains the long code state and the synchronous channel super frame synchronization.

FIG. 11 is a flow chart illustrating a method for performing a handoff between a synchronous base station and an asynchronous base station in accordance with another embodiment of the present invention.

First, a first and a second common channel between a synchronous base station and a mobile station are set at step S301. The mobile station is connected to the asynchronous mobile station at step S302. Monitoring information of neighbor base stations is transmitted to the asynchronous base station at step S303. It is determined whether there is an asynchronous base station satisfied with a handoff condition at step s304. If there is the asynchronous base station performing the handoff, the handoff to the neighbor asynchronous base station is performed at step S305. If not, the mobile station requests a handoff to the synchronous base station and receives a compressed mode message through a common channel at step S306. The compressed mode message includes the common code, the Walsh code $W_c$ and the Walsh code $W_L$ as described above.

The mobile station sets a zero offset and a pilot pseudo noise (PN) sequence timing based on a common code and a Walsh code $W_c$ at step S307. After obtaining the zero offset timing information, a synchronous base station having a maximum pilot signal is set as the synchronous base station to be communicated with by searching only corresponding pilot offsets in list of the neighbor base station at step S308. In other words, the maximum pilot signal is obtained by using the zero offset timing set at the step S307. Here, the mobile station should have not only the lists of the neighbor asynchronous base station but also those of the synchronous base station.

A long code state and a frame synchronization are acquired by using a Walsh code $W_L$ at step S309. The handoff to the synchronous base station is performed at step S310.

The mobile station should obtain timing information of the synchronous base station, the pilot offset and the long code state used in the traffic channel during the idle period of the compressed mode.

In order to obtain information necessary to the handoff within the idle period, an additional common channel is set and transmitted to all of asynchronous base stations neighbor to the synchronous base station. According to the zero offset timing information, the long code state and the synchronous channel super frame timing information received from the synchronous base station through the common channel, the handoff from the asynchronous base station to the synchronous base station can be performed.

Therefore, since the long code state can be obtained without demodulation of the synchronous channel of the synchronous base station, there is an advantage in that the time for the handoff can be reduced to a minimum value.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for performing a handoff from an asynchronous base station to a synchronous base station, comprising the steps of:
   a) receiving, at a mobile station from the asynchronous base station, a neighbor list that identifies one or more synchronous base stations neighboring the asynchronous base station;
   b) setting a common channel between a first synchronous base station and the mobile station;
   c) determining whether there is an asynchronous base station to be handed off in neighbor asynchronous base stations based on monitoring information of the neighbor asynchronous base stations;
   d) if there is no asynchronous base station, requesting a handoff to one of the synchronous base stations neighboring the asynchronous base station and receiving, from the first synchronous base station through the common channel, a compressed mode message that includes, for each synchronous base station neighboring the asynchronous base station, (i) pseudo noise (PN) sequence zero offset timing information based on a common code and a zero offset, (ii) long code state information, and (iii) synchronous channel super frame timing information;

e) after receiving the PN sequence zero offset timing information for each synchronous base station neighboring the asynchronous base station, selecting, from among the one or more synchronous base stations identified by the neighbor list, a synchronous base station to be handed off based on that base station having a pilot signal with a maximum value;

f) obtaining a long code state and a synchronous channel super frame timing from the long code state information and the synchronous channel super frame timing information for the synchronous base station selected; and g) performing the handoff from the asynchronous base station to the synchronous base station selected, wherein obtaining the long code state and the synchronous channel super frame timing involves: (i) obtaining a synchronization of the common channel, (ii) storing one period of the compressed message transmitted through the common channel, and (iii) selecting the maximum value among long code states and synchronous channel super frame timings obtained from the compressed message transmitted through the common channel at every period.

2. The method as recited in claim 1, wherein information transmitted through the common channel includes a common code, a zero offset, a long code state and a synchronous channel super frame timing.

3. The method as recited in claim 2, wherein the common channel starts to transmit in synchronization with a starting point of a pilot channel of the synchronous base station.

4. The method as recited in claim 1, wherein obtaining the long code state and the synchronous channel super frame timing involves:
  (i) obtaining a synchronization of the common channel,
  (ii) storing one period of the information transmitted through the common channel, and
  (iii) selecting the most frequent one among long code states and synchronous channel super frame timings obtained from the information transmitted through the common channel at every period.

5. The method as recited in claim 2, wherein the long code state and the synchronous channel super frame timing are N-ary modulated and then transmitted.

6. A method for performing a handoff from an asynchronous base station to a synchronous base station, comprising the steps of:
  a) receiving, at a mobile station from the asynchronous base station, a neighbor list that identifies one or more synchronous base stations neighboring the asynchronous base station;
  b) setting at least one common channel between a first synchronous base station and the mobile station;
  c) determining whether there is an asynchronous base station to be handed off in neighbor asynchronous base stations based on monitoring information of the neighbor asynchronous base stations;
  d) if there is no asynchronous base station, requesting a handoff to one of the synchronous base stations neighboring the asynchronous base station and receiving, from the first synchronous base station through a common channel, a compressed mode message that includes, for each synchronous base station neighboring the asynchronous base station, (i) pseudo noise (PN) sequence zero offset timing information based on a common code and a zero offset, (ii) long code state information, and (iii) synchronous channel super frame timing information;
  e) after receiving the PN sequence zero offset timing information for each synchronous base station neighboring the asynchronous base station, selecting, from among the one or more synchronous base stations identified by the neighbor list, a synchronous base station to be handed off based on that base station having a pilot signal with a maximum value;
  f) obtaining a long code state and a synchronous channel super frame timing from the long code state information and the synchronous channel super frame timing information for the synchronous base station selected; and
  g) performing the handoff from the asynchronous base station to the synchronous base station selected, wherein obtaining the long code state and the synchronous channel super frame timing involves: (i) obtaining a synchronization of the common channel, (ii) storing one period of the compressed message transmitted through the common channel, and (iii) selecting the maximum value among long code states and synchronous channel super frame timings obtained from the compressed message transmitted through the common channel at every period.

7. The method as recited in claim 6, wherein information transmitted through the common channel includes a common code, a zero offset, a long code state and a synchronous channel super frame timing.

8. The method as recited in claim 7, wherein the common channel starts to transmit in synchronization with a starting point of a pilot channel of the synchronous base station.

9. The method as recited in claim 6, wherein obtaining the long code state and the synchronous channel super frame timing involves:
  (i) obtaining a synchronization of the common channel,
  (ii) storing one period of the information transmitted through the common channel, and
  (iii) selecting the most frequent one among long code states and synchronous channel super frame timings obtained from the information transmitted through the common channel at every period.

10. The method as recited in claim 7, wherein the long code state and the synchronous channel super frame timing are N-ary modulated and then transmitted.

* * * * *